(12) United States Patent
Muppala et al.

(10) Patent No.: US 11,720,387 B2
(45) Date of Patent: Aug. 8, 2023

(54) MANAGING COMMUNICATION RATES BETWEEN APPLICATIONS IN A TIERED APPLICATION COMPUTING ENVIRONMENT

(71) Applicant: VMware, Inc., Palo Alto, CA (US)

(72) Inventors: Suresh Babu Muppala, Cupertino, CA (US); Venkatakrishnan Rajagopalan, Santa Clara, CA (US); Sirisha Myneni, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 228 days.

(21) Appl. No.: 16/942,196

(22) Filed: Jul. 29, 2020

(65) Prior Publication Data
US 2022/0035645 A1 Feb. 3, 2022

(51) Int. Cl.
*G06F 9/455* (2018.01)
*G06F 9/50* (2006.01)
*G06F 9/48* (2006.01)
*G06F 11/30* (2006.01)

(52) U.S. Cl.
CPC .......... *G06F 9/45558* (2013.01); *G06F 9/485* (2013.01); *G06F 9/505* (2013.01); *G06F 9/5077* (2013.01); *G06F 11/301* (2013.01); *G06F 2009/4557* (2013.01); *G06F 2009/45583* (2013.01)

(58) Field of Classification Search
CPC ................................................... G06F 9/45558
See application file for complete search history.

(56) References Cited

U.S. PATENT DOCUMENTS

| | | | |
|---|---|---|---|
| 9,667,569 B1 | 5/2017 | McHugh et al. | |
| 2014/0280885 A1* | 9/2014 | Ayandeh | H04L 47/39 709/224 |
| 2020/0127937 A1* | 4/2020 | Busick | H04L 41/40 |
| 2020/0329098 A1* | 10/2020 | Boddam | G06F 11/3692 |

* cited by examiner

*Primary Examiner* — Charlie Sun

(57) ABSTRACT

Described herein are systems, methods, and software to manage communication rates between applications in a tiered application computing environment. In one implementation, a load service monitor load information associated with applications that each execute using one or more virtual nodes. The load service further determines that the load information associated with an application of the applications satisfy one or more load criteria and identifies at least one application that communicates requests to the application. Once identified, the load service communicates a notification to the at least one application to update a communication request configuration to the application.

20 Claims, 6 Drawing Sheets

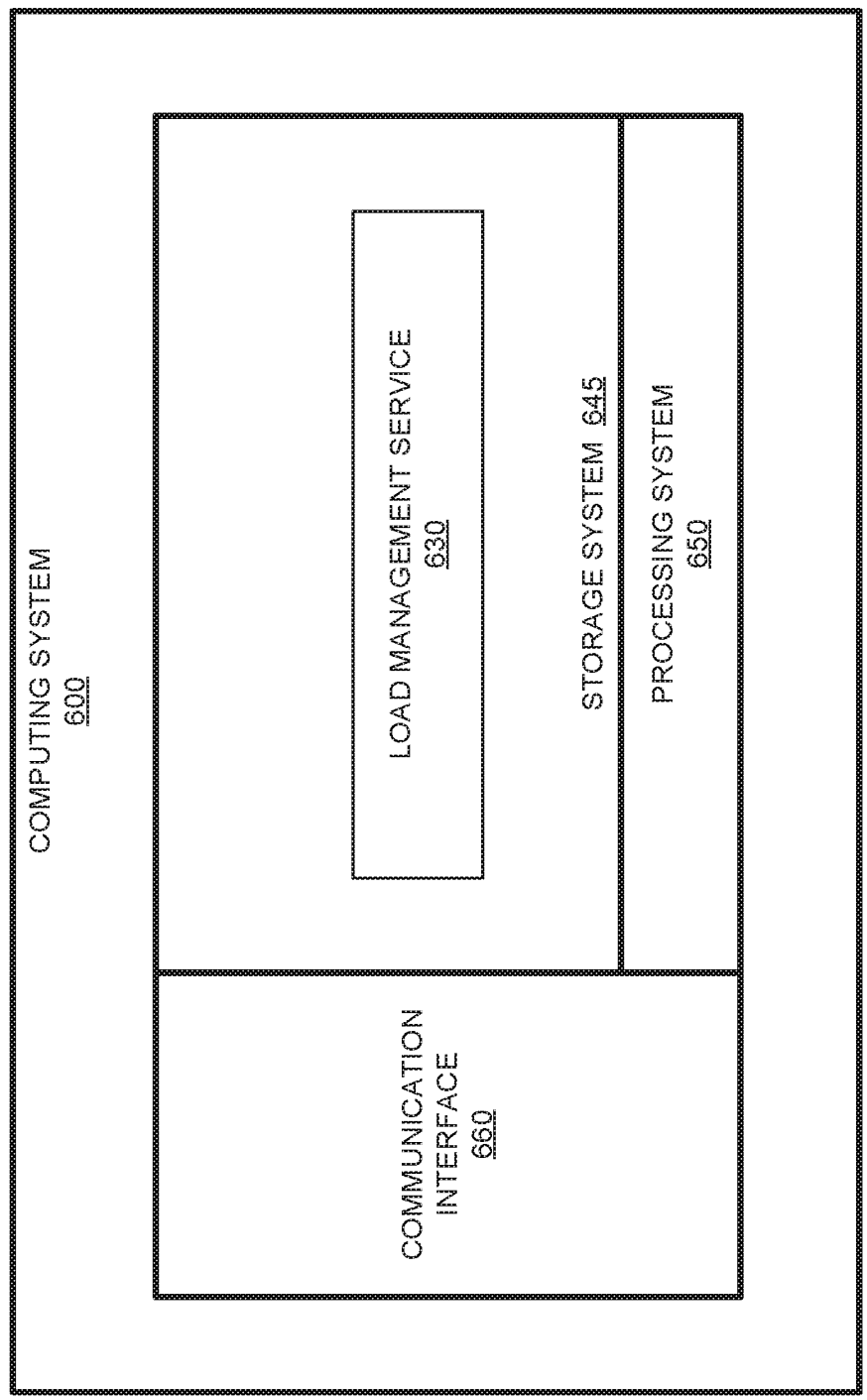

MANAGING COMMUNICATION RATES BETWEEN APPLICATIONS IN A TIERED APPLICATION COMPUTING ENVIRONMENT

TECHNICAL BACKGROUND

In computing environments, software defined networks may be used that comprise software modules capable of providing a communication platform for one or more virtual nodes in the computing environment. The software defined networks, which may include logical switches, routers, distributed firewalls, and the like, may be used to intelligently direct communications on the network by inspecting packets before passing them to other computing nodes. In some implementations, a logical router may be used to route communications to different application tiers in a tiered application computing environment. For example, a logical router may be configured to permit a web tier to communicate with an application tier and the application tier to communicate with a database tier. The logical router may be configured to provide load balancing and other operations for the virtual nodes (virtual machines, containers, and the like) that support the application tiers.

While tiered applications provide an efficient mechanism for managing the communications between different portions of an organizations network, difficulties can arise in effectively identifying and managing bottlenecks in the computing network. For example, a database tier may experience load issues that prevent the database tier from receiving any further requests from an application tier. These load issues can cause the database tier to miss packets, cause errors in responding to the requests, or provide some other issue.

SUMMARY

The technology described herein provides rate limiting between applications in a datacenter based on application load. In one implementation, a method of managing communication rates between applications in a tiered application computing environment includes monitoring load information associated with applications in the computing environment and determining that the load information associated with an application of the applications satisfies load criteria. In response to satisfying the load criteria, the method further provides identifying at least one application of the applications that communicates requests to the application and communicating a notification to the at least one application to modify a configuration for communicating requests to the application.

BRIEF DESCRIPTION OF THE DRAWINGS

FIG. 6 illustrates a load service computing system to manage communication rates between applications according to an implementation.

DETAILED DESCRIPTION

Figure 1:
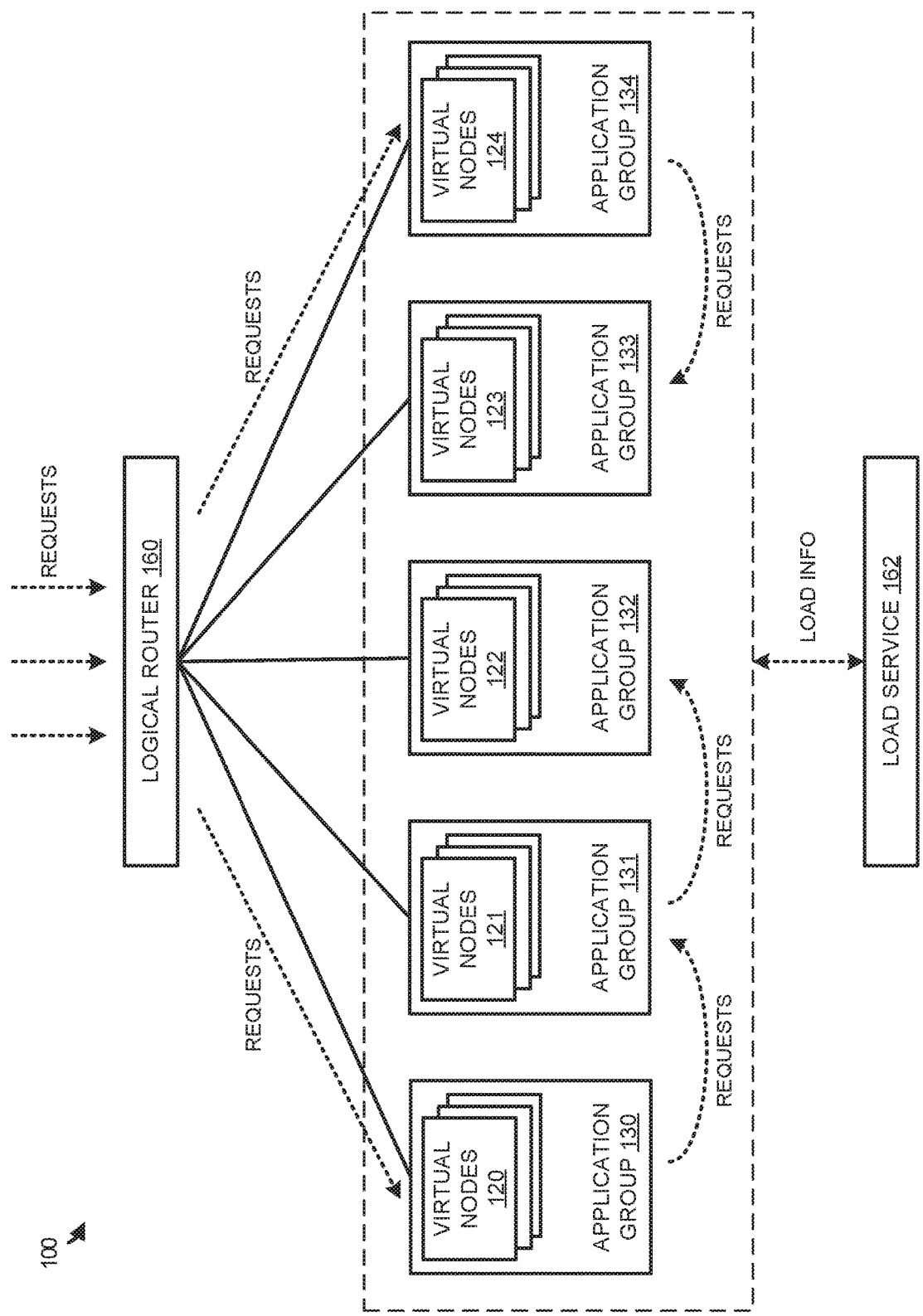
FIG. 1 illustrates a computing environment to manage communication rates between applications according to an implementation.

FIG. 1 illustrates a computing environment 100 to manage communication rates between applications according to an implementation. Computing environment 100 includes logical router 160, application groups 130-134 with virtual nodes 120-124, and load service 162. Virtual nodes 120-124 may execute using one or more host computing systems and may comprise virtual machines, containers, or some other virtualized endpoint. Logical router 160 may execute on the one or more host computing systems (and one or more additional computing systems in some example) and provides a software abstraction of at least one physical router for virtual nodes 120-124. Logical router 160 may manage the routing of packets, load balancing, and other routing operations for the virtual nodes.

As depicted in computing environment 100, logical router 160 may receive data requests and forward the requests to either application group 130 or application group 134. Application group 130 and 134 are representative of an application tier in computing environment 100, wherein a first tier may provide a first operation, while subsequent (lower) tiers provide additional operations. In the example of application group 130, application group 130 may provide requests to application group 131 and application group 131 may provide requests to application group 132. Alternatively, application group 134 may communicate requests to another tier represented by application group 133.

In some implementations, logical router 160 may provide load balancing operations between the different tiers of the network. The load balancing operations may be used to select a virtual node in a tier to respond to a request. For example, when a virtual node in application group 130 generates a communication directed at application group 131, logical router 160 may identify the request and select a virtual node in virtual nodes 121 to support the request. Once selected, the communication may be forwarded to the corresponding virtual node. In some examples, each application group may share a common internet protocol (IP) address, wherein logical router 160 is responsible for translating the address into a unique address associated with the selected virtual node.

Here, in addition to the operations provided by application groups 130-134 and logical router 160 to respond to requests received at logical router 160, load service 162 is included. Load service 162 is used to monitor the load on various application groups in computing environment 100 and determine whether changes should be made to egress requests from another application group. For example, load service 162 may monitor the load on application group 132, the load may comprise processing resource usage in the virtual nodes, memory usage in the virtual nodes, processing resource usage by the one or more hosts of the virtual nodes, memory usage on the one or more hosts for the virtual nodes, or some other load characteristic. The load information may be supplied directly from agents operating within the virtual nodes, wherein the load service may have hooks to receive information from the virtual nodes, may be supplied from the hosts providing the platform for the virtual nodes, or may be provided in some other manner. For example, virtual nodes within each of the application groups may provide information about the memory and processing system load for each of the virtual nodes. The information may be provided to load service 162 periodically, in response to a request from load service 162, when the load meets criteria for a virtual node or a host, or at some other interval. Load service 162 may be distributed across one or more of the hosts for virtual nodes 120-124 or may execute on a separate computing system.

In some implementations, load service 162 may identify load information for a first application group and communicate with application groups that are reliant or supply requests to the application group. As a result, if application group 132 satisfied load criteria, load service 162 may notify at least application group 131, and in some examples application group 130, indicating the load associated with application group 132. In response to receiving the notification, the application group or groups may rate limit the rate of requests to application group 132. In some examples, load service 162 may indicate the changes to the communication rates for the applications, however, agents executing locally on the virtual nodes may determine the communication rate change. The rate limiting configuration change may include preventing all future requests to the affected application group, limiting the rate of requests to the affected application group, limiting the types of requests to the affected application group, or some other rate limiting configuration change. In some implementations, different types of requests may use more computing resources or may be identified as a higher quality of service. As a result, load service 162 may change the configuration of the requesting applications to limit request rates for request types that use increased processing resources, request types that are associated with a lower quality of service, or some other group of request types.

In some examples, the load service may update configurations that directly communicate requests to the affected application. In other implementations, in addition to or in place of changing the configuration for applications in tiers directly above the affected application, load service 162 may update configurations for applications in other tiers of the tiered application environment. As an example, load service 162 may determine that the load associated with application group 132 satisfies one or more criteria. Once identified, application group 130 and/or application group 131 may be notified of the load condition to change the configuration for communicating requests. The configuration change may be used to change the rate of requests from the application from a first rate to a second rate, may be used to stop requests, may be used to change where requests are communicated by application, or some other modification. For example, in response to a load notification, application group 130 may change from communicating requests to application group 131 to communicating requests to application group 133, wherein application group 133 may provide the same or different functionality.

Figure 2:
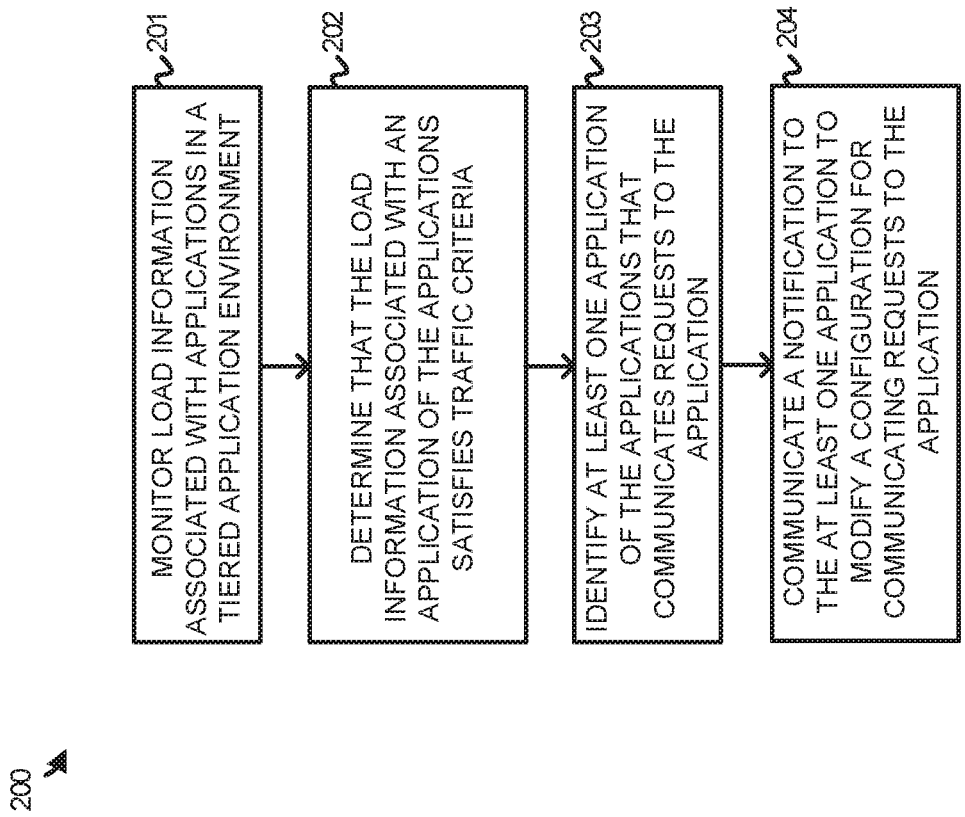
FIG. 2 illustrates a method of operating a load service to manage communication rates between applications according to an implementation.

FIG. 2 illustrates a method 200 of operating a load service to manage communication rates between applications according to an implementation. The steps of method 200 are referenced parenthetically in the paragraphs that follow with reference to systems and elements of computing environment 100 of FIG. 1.

As depicted, method 200 includes monitoring (201) load information associated with applications in a tiered application environment. In the example computing environment 100, application groups 130-134 may be configured as tiers, such that a first tier receives first requests and is permitted to generate requests to another tier to support the required operation. For each of the application tiers, one or more virtual nodes may be deployed to provide the required operation. The requests from a first tier may then be distributed by logical router 160 to a virtual node in the next tier, wherein logical router 160 may provide load balancing to the various virtual nodes that belong to the application group or tier. For example, a request from a virtual node in application group 131 to application group 132 may be received by logical router 160, logical router 160 may select a virtual node in virtual nodes 122 to support the request, and may forward the request to the corresponding virtual node.

As logical router 160 provides networking for the application tiers, load service 162 may monitor load information associated with application groups 130-134 that represent the tiers. In some implementations, the load information is provided directly from the virtual nodes, but it should be understood that the information may be provided from one or more host computing systems that provide a platform for the virtual nodes. The load information may be related to processing system usage for the virtual nodes, memory usage of the virtual nodes, processing system usage of the one or more hosts, memory usage of the one or more hosts, or some other load information. The load information may further comprise queue length for the receive queues of the application groups. In some examples, the load information may be obtained from the virtual nodes periodically, in response to a request from load service 162, when the load information on the host or virtual node satisfies criteria, such as minimum or maximum load, or some other interval.

As the load service monitors the load information, method 200 further includes determining (202) that the load information associated with an application of the applications satisfies load criteria. The load criteria may comprise a threshold amount of memory usage, processing system usage, or some other usage associated with the virtual nodes for an application or the one or more hosts supporting the virtual nodes. For example, load service 162 may determine when memory usage by the virtual nodes in application group 131 satisfy a threshold amount of memory usage.

Once the load information satisfies the criteria, method 200 further provides identifying (203) at least one application of the applications that communicates requests to the application. Referring to the example of application group 131 satisfying the load criteria, load service 162 may identify one or more other application groups in the environment that provide requests to application group 131, which comprises application group 130 in the present example. In some examples, load service 162 may provide a notification to all applications in a higher tier from the affected application, however, load service 162 may select a subset of the applications. The selection may be based on the types of requests made by the application, the quantity of requests made by the application, or some other factor. After identifying the at least one application, method 200 includes communicating (204) a notification to the at least one application to modify a configuration for communicating requests to the application. In some implementations the modification may include throttling or reducing the request rate to the affected application group, pausing the forwarding of requests to the affected application group, changing what requests are available to the application group, or some other modification.

In some implementations, load service 162 may include an instruction indicating the type of rate modification for the related application. In other implementations, load service 162 may provide information about the affected application and the related application (nodes that belong to the application) may determine an appropriate modification to the request rate. The modifications employed by the application may be for a temporary time period or may exist until a second notification is provided by load service 162 indicating that the affected application is capable of receiving additional requests. The second notification may be determined based on load information associated with the affected application, including the processing system load, memory load, or other load information.

In some implementations, in addition to or in place of modifying the configuration of applications that directly generate requests to the affected application, load service 162 may change the configuration of other applications in the topology. For example, if the load associated with application group 132 satisfied one or more load criteria, load service 162 may identify applications in the topology sequence for the application group 132, which includes application groups 130-131. Instead of changing the configuration associated with application group 131, load service 162 may modify the configuration of application group 130 to limit the load associated with application group 132 and application group 131. The configuration change for application group 130 may include limiting the rate of requests to application group 131, stopping requests to application group 131, change the route of requests to another application group, or provide some other configuration modification. For example, a configuration change from load service 162 may include redirecting requests to another application, wherein the other application may provide the same service or may provide limited services, such as a backup database application.

In some examples, the applications may be deployed across multiple datacenters, such as a local datacenter and a cloud-based data center. Load service 162 may identify the locations of the virtual nodes associated with the different applications and may initiate changes to communication rates for the applications based on the location of the applications. For example, if a large load exists on one or more applications executing in a local datacenter, load service 162 may initiate changes to the communication rates for any application executing in a remote datacenter that communicates requests to the one or more applications.

In some implementations, load service 162 may update load balancing operations for logical router 160 based on the load information associated with each of the applications. For example, load service 162 may determine that the memory load on a subset of the virtual nodes for application group 132 satisfies memory usage criteria. As a result, load service 162 may notify logical router 160 to select virtual nodes that are not part of the subset for application group 132 to respond to requests. In some implementations, the changes to the load balancing configuration may be combined with changing the request communication rate. Using the example for application group 132, load service 162 may generate a first notification for logical router 160 to direct requests to virtual nodes that did not satisfy the memory criteria and may generate a second notification for application group 131 that indicates reducing the request rate to application group 132.

Although demonstrated in the previous examples as reducing the request rate between application tiers, it should be understood that load service 162 may increase the request rate. For example, if load information associated with application group 132 indicated that resources were available for additional requests, load service 162 may permit application group 131 to increase the request rate to application group 132. Additionally, while a first load associated with a first application may decrease the request rate for a second application, a second load associated with the first application may increase the request rate for the second application. This may permit the second application to accommodate the load of the first application and return to a previous rate once the first application has recovered. Alternatively, the second load associated with the first application may also implement another decrease in the request rate for the second application.

Figure 3:
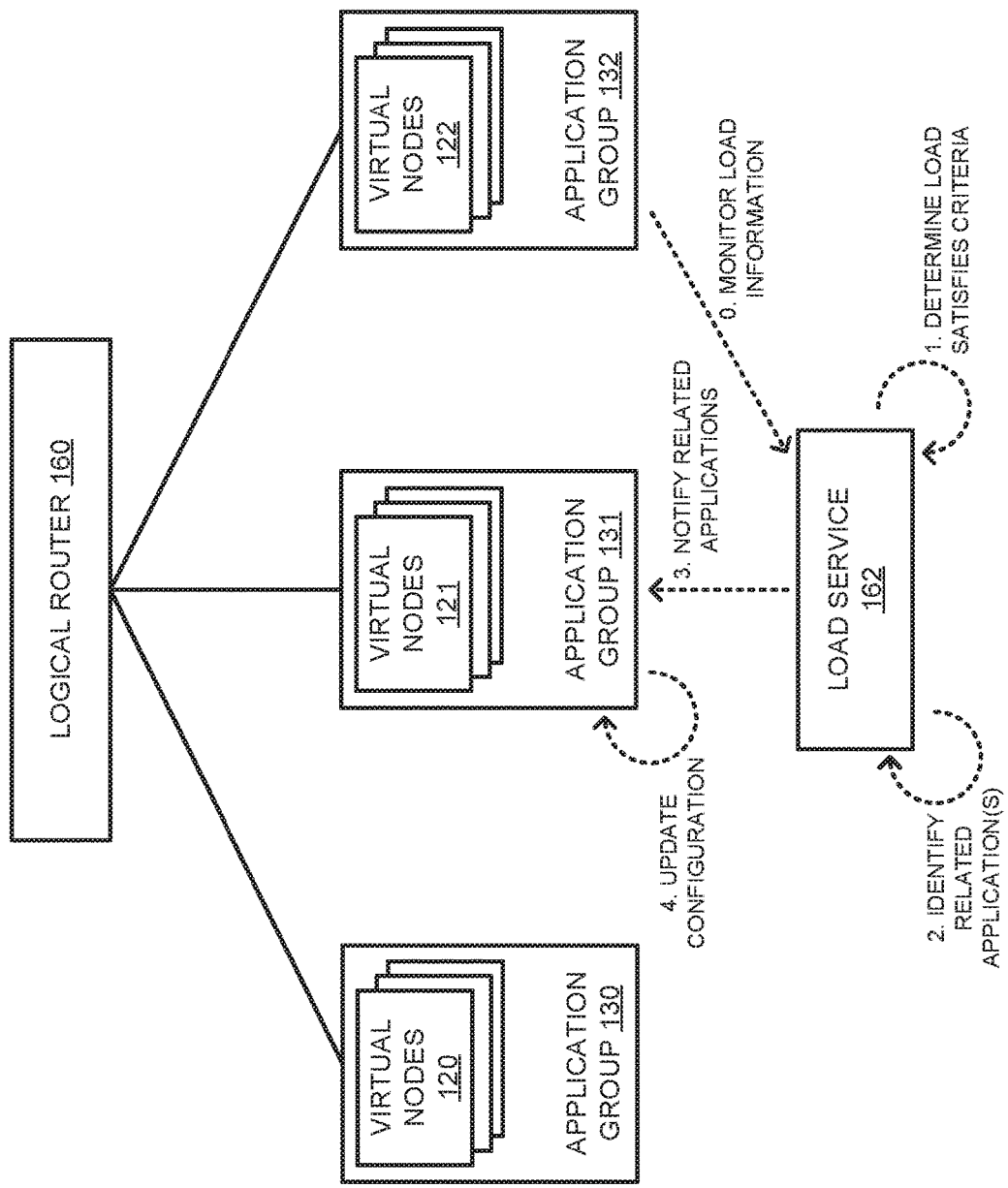
FIG. 3 illustrates an operational scenario of managing communication rates between applications according to an implementation.

FIG. 3 illustrates an operational scenario 300 of managing communication rates between applications according to an implementation. Operational scenario 300 includes logical router 160 application groups 130-132 with virtual nodes 120-122, and load service 162 from computing environment 100 of FIG. 1.

As depicted in operational scenario 300, load service 152 monitors, at step 0, load information associated with application group 132, wherein the load information may correspond to the individual virtual nodes or may correspond to host computing systems that host the virtual nodes. While monitoring the load information, load service 162 may determine, at step 1, when the load information satisfies one or more load criteria. For example, a load criterion may correspond to an amount of memory being used by virtual nodes 122. Once the one or more load criteria are satisfied, load service 162 may identify, at step 2, one or more related applications to the affected application. As described herein, applications may be organized into tiers that manage how individual applications communicate. For example, a web or front-end tier may communicate requests to an application tier, while the application tier may communicate requests to a database tier. When the load information, indicates a possible issue with one of the tiers, such as application group 132, the related applications are identified by load service 162, such that configurations are updated for communicated requests to the affected tier.

Here, load service 162 identifies that application group 131 communicates requests to application group 132 and notifies, at step 3, application group 131 of the load associated with application group 132. Once notified, the virtual nodes in application group 131 may update a request rate configuration based on the notification. The update to the configuration may include reducing the rate at which requests are delivered to application group 132, pausing all requests to application group 132, changing the types of requests that are permitted to application group 132, or some other modification to the configuration. Advantageously, by holding or slowing the rate of requests to application group 132, load service may stop, or limit requests being dropped or not responded to by application group 132.

In some examples, the virtual nodes may include an agent capable of identifying current load information for the virtual node and communicating the information to load service 162. Load service 162 may aggregate the information to determine a summarized load for the particular application. The summarized load information may include average memory or processing resources used by the virtual nodes, total memory or processing resources used by the virtual nodes, or some other information. In some examples, the load information may further be supplied by the host computing systems, wherein the host computing systems may provide information about processing system resource usage for the host, memory system usage of the host, or some other information about the host.

In some implementations, in addition to or in place of updating the request configurations associated with a related application, load service 162 may update the load balancing configuration associated with logical router 160. The load balancing update may be based on load information associated with each virtual node in virtual nodes 122, wherein load service 162 may identify nodes that are preferred for requests based on processing resources used by each of the virtual nodes, memory resources used by each of the virtual nodes, or by some other load metric.

Although demonstrated as updating a configuration associated with an application one tier higher in the computing environment, it should be understood that modifications may also be made to other higher tiers in the computing environment. For example, because application group 130 provides requests to application group 131, load service 162 may also update the rate for application group 130 to communicate requests to application group 131 to prevent an increased load in application group 131. The modifications to application group 130 may include limiting the request rate from application group 130 to application group 131, stopping the requests from application group 130 to application group 131, changing requests from application group 130 to another application, or providing some other configuration modification.

Figure 4:
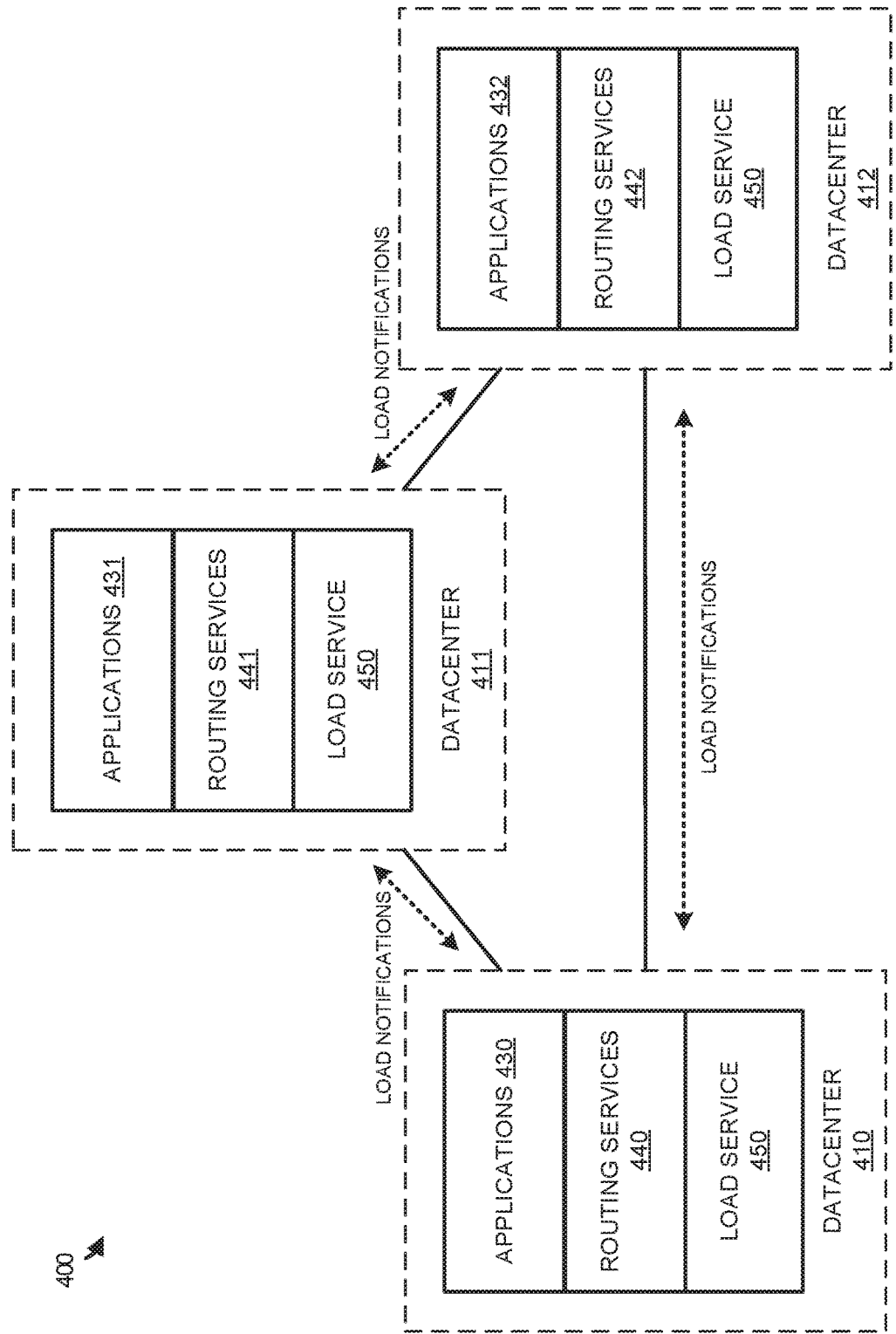
FIG. 4 illustrates an operational scenario of managing communication rates between applications and datacenters according to an implementation.

FIG. 4 illustrates an operational scenario 400 of managing communication rates between applications and datacenters according to an implementation. Operational scenario 400 includes data centers 410 with applications 430-432, routing services 440-442, and load service 450. Routing services 440-442 may be representative of a distributed logical router that manages communications between local computing nodes (e.g., virtual machines, containers, and the like) and computing nodes at other locations and datacenters.

In some computing environments, applications may be deployed in different datacenters based on the requirements of the applications. Here, applications 430-432 execute in datacenters 410-412, which each may comprise one or more host computing systems, networking devices, or other equipment, and can communicate using routing services 440-442. To monitor the status or load for the various applications, load service 450 is provided that obtains load information about the executing applications and determines changes to the communication rates between the various applications. In some examples, applications 430-432 may be configured as a tiered application environment, where different applications can communicate based on their corresponding tier.

As the load information is obtained, load service 450 may determine when the load information satisfies one or more criteria. In some examples, load service 450 may aggregate load information associated with applications at a particular datacenter. Based on the aggregated information, the load service may notify other datacenters to change request rates to applications at the datacenter with the load. As an example, datacenter 410 may be experiencing a load associated with applications 430 that satisfies one or more criteria. In response, to satisfying the one or more criteria, load notifications may be communicated to datacenters 411-412 indicating a request to change the request rate to applications 430. The modification may include pausing all requests, rate limiting the requests, or providing some other modification for the requests to datacenter 410 and applications 430. In another example, an application at a first datacenter may satisfy load criteria. When the load is identified, a notification may be delivered to one or more other applications in higher tiers than the affected application. These applications may be local to the same datacenter or may be distributed in other datacenters. A configuration modification may be used to change the tiered configuration, such that an application that communicates requests to a first application may be changed to communicate with a second application. Advantageously, the load service may limit or stop requests to the affected application by routing requests to other applications, which may be located in other datacenters.

In some implementations, in addition to, or in place of, changing the request rates associated with applications in the computing environment, load service 450 may update load balancing operations for routing services 440-442, such that requests may be favored to virtual nodes for applications that are not affected by a load constraint. For example, datacenters 410-411 may both execute the same application in an application tier for an organization. If data center 410 has a load on the application that satisfies load criteria, load service 450 may generate a load notification that indicates to at least one of datacenter 411 or datacenter 412 to favor the use of datacenter 411 for the use of the application. Advantageously, requests from another application tier may be forwarded to instances of the application with a lesser load.

Figure 5:
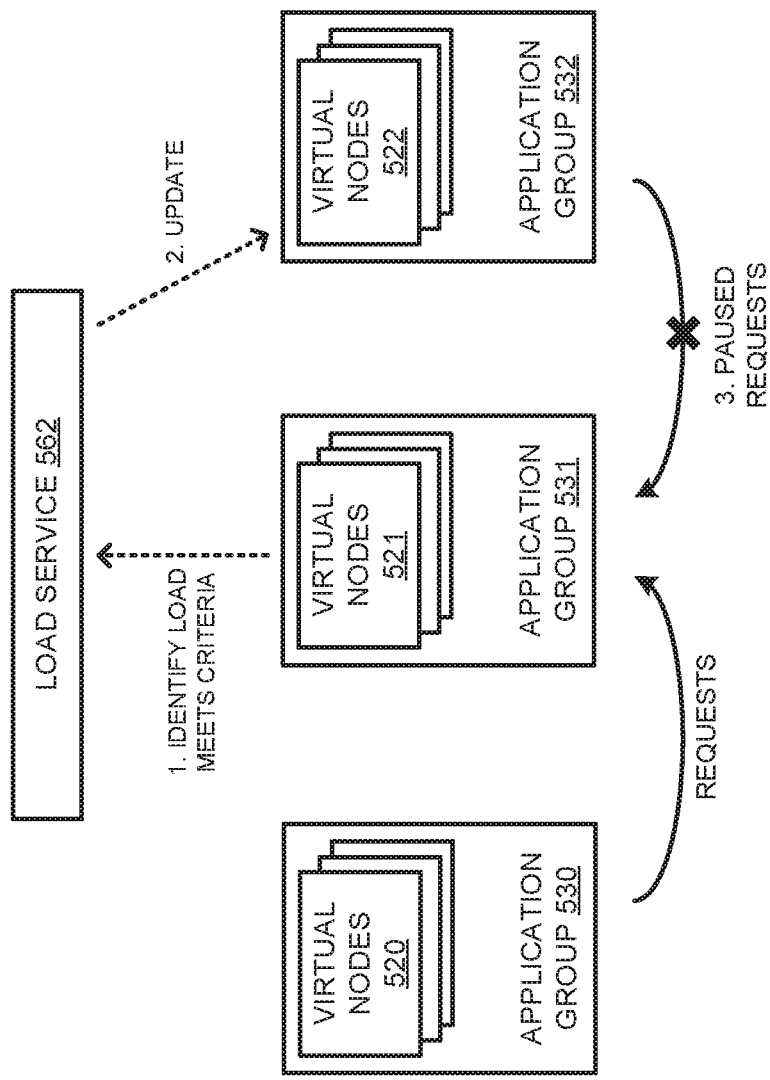
FIG. 5 illustrates an operational scenario of managing communications between applications according to an implementation.

FIG. 5 illustrates an operational scenario 500 of managing communications between applications according to an implementation. Operational scenario 500 includes load service 562 and application groups 530-532 with virtual nodes 520-522. Application groups 530-532 are representative of a tiered application environment, wherein application groups 530 and 532 are a higher tier capable of generating requests to application group 531 using a logical router (not pictured).

In operation, load service 562 monitors load information associated with each application group of application groups 530-532. Application groups 530-532 each include virtual nodes 520-522, which can comprise virtual machines or some other virtualized endpoint that execute using one or more host computing systems. The load information may include load information associated with the virtual machines or may include load information associated with the hosts for the virtual machines. Here, load service 562 determines that the load information associated with application group meets one or more criteria, at step 1. In response to determining that the load information meets the one or more criteria, load service 562 may determine any application groups that provide request to application group 531, which includes application groups 530 and 532.

Once the application groups are identified, load service 562 selects at least one application group of the application groups to change the request rate of the at least one application group to the affected application. The selection may be based on the types of requests generated by the application group, the quantity of requests generated by the application group, or some other metric. In the present example, load service 562 identifies application group 532 to update the request configuration, at step 2, wherein the update includes pausing requests from application group 532 to application group 531. In some examples the pausing of the requests may occur for a defined time period, however, the pausing of requests or modifying the configuration may exist until a second update is provided by load service 562 to increase the request rate to application group 531.

Although demonstrated in the example of operational scenario 500 as pausing requests from application group 532 to application group 531, it should be understood that other modifications may include limiting the request rate of application group 532, limiting requests to a particular type of request or providing some other operation. In some examples, application group 532 may cache the requests in a buffer or some other memory until the requests are permitted to be forwarded to application group 531. Further, while demonstrated as changing the configuration to one of the application groups, it should be understood that load service 562 may implement changes in multiple application groups. The modification may be the same for both groups and may be different for the groups. The determination of the modification for each of the groups may be based on the types of requests, the quantity of requests, the load on the affected application group, or some other metric.

In some implementations, different types of requests may use more computing resources or may be identified as a higher quality of service. As a result, load service 562 may change the configuration of the requesting applications to limit request rates for request types that use increased processing resources, request types that are associated with a lower quality of service, or some other group of request types.

In some implementations, load service 562 may identify applications in higher tiers from the affected application. In particular, rather than updating a configuration for the application in the directly higher tier that initiates requests with the affected application, load service 562 may update a configuration associated with applications in higher tiers that do not directly generate requests for the affected application. These configuration changes may include limiting requests to other applications in the tiered environment, stopping requests between application tiers, changing where requests are directed for an application, or some other configuration modification. For example, the load service may identify an application three tiers above the affected application. Once identified, the load service may initiate an operation to change the configuration to direct future requests to an alternative application, wherein the other application may provide the same service, limited services, or some other service.

FIG. 6 illustrates a computing system 600 to manage communication rates between applications according to an implementation. Computing system 600 is representative of any computing system or systems with which the various operational architectures, processes, scenarios, and sequences disclosed herein for a load service can be implemented. Computing system 600 is an example of communication load service 162 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more host computing systems that provide a platform for virtual nodes of a tiered application environment.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises load management service 630 capable of providing at least operation 200 of FIG. 2. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, load management service 630 directs processing system 650 to monitor load information associated with applications in a tiered application environment, wherein each of the applications is deployed as one or more virtual nodes, such as virtual machines, containers, and the like. While monitoring the load, load management service 630 may direct processing system 650 to determine that the load information associated with an application of the applications satisfies one or more load criteria. The load criteria may correspond processing system or memory usage by the one or more virtual nodes of the application, processing system or memory usage by the host computing systems, or some other metric. In some implementations, load management service 630 may consider the aggregate load corresponding to the resource usage associated with all of the virtual nodes associated with a particular application. For example, load management service 630 may determine an average memory usage by virtual machines in the tiered computing environment and determine when the average memory usage exceeds a threshold.

When the load satisfies the one or more criteria, load management service 630 directs processing system 650 to identify one or more applications that communicate requests to the affected application. For example, if the affected application tier, the applications that communicate requests to the database may be identified. Once the one or more applications are identified, load management service 630 directs processing system 650 to communicate a notification to the one or more applications to modify a configuration for communicating requests to the application. The configuration modification may include pausing requests to the affected application, rate limiting requests to the affected application, limiting the type of request to the affected application, or some other modification to the configuration. For example, the notification may be used to change the rate of requests from the application from a first rate to a second rate. The configuration modification may then be maintained until a second notification is provided from load management service 630 indicating that the load has decreased on the affected application.

In some implementations, in addition to or in place of the modification to the requests for applications communicating requests, load management service 630 may update a load balancer associated with the applications. The load balancer may be used to receive requests that use a common IP address for an application and distribute the requests to the various virtual nodes that provide the application. Here, if the virtual nodes for an application, or a subset of the virtual nodes for an application are experiencing load, load management service 630 may update the load balancer, such that requests are provided to virtual nodes that are not experiencing the increased load.

In some examples, in addition to changing the request configuration for applications communicating requests to the affected application, load management service 630 may communicate a notification to other applications in the tiered computing environment. These other applications may communicate requests to the one or more applications that are limiting requests to the affected application. Advantageously, by limiting the requests throughout the environment, load management service 630 may curb the load on applications at various tiers.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    monitoring, in a load service, load information associated with applications in a tiered application environment, wherein each of the applications executes using one or more virtual nodes, and wherein the load service executes separate from the applications;
    determining, in the load service, that the load information associated with a first application in a first tier of the applications satisfies one or more load criteria; and
    in the load service and in response to determining that the load information associated with the first application satisfies the one or more load criteria:
        identifying at least one other application of the applications in a different tier, wherein the different tier is two or more tiers above the first tier; and
        communicating a notification to the at least one other application to modify a configuration for communicating requests in the tiered application environment.

2. The method of claim 1, wherein the one or more virtual nodes comprises one or more virtual machines.

3. The method of claim 1, wherein the load information comprises memory usage or processing system usage by the virtual nodes for the applications.

4. The method of claim 1, wherein the load information comprises memory usage or processing system usage on one or more host computing systems that host the virtual nodes.

5. The method of claim 1 further comprising:
    in response to the notification, changing a communication rate from the at least one other application from a first rate to a second rate.

6. The method of claim 5 further comprising:
    determining that the load information associated with the first application satisfies one or more second load criteria; and
    communicating a notification to the at least one other application to return to the first rate.

7. The method of claim 1 further comprising:
    in response to the notification, pausing communications from the at least one other application.

8. The method of claim 1, wherein the at least one other application communicates requests to the first application.

9. The method of claim 1, wherein communicating the notification to the at least one other application to modify the configuration for communicating requests in the tiered application environment comprises communicating the notification to the at least one other application to change a destination for requests from the at least one other application.

10. A computing apparatus comprising:
    a storage system;
    a processing system operatively coupled to the storage system; and
    program instructions stored on the storage system that, when executed by the processing system, direct the computing apparatus to:
        monitor, in a load service, load information associated with applications in a tiered application environment, wherein each of the applications executes using one or more virtual nodes, and wherein the load service executes separate from the applications;
        determine that the load information associated with a first application in a first tier of the applications satisfies one or more load criteria; and
        in response to determining that the load information associated with the first application satisfies the one or more load criteria:
            identify at least one other application of the applications in a different tier, wherein the different tier is two or more tiers above the first tier; and
            communicate a notification to the at least one other application to modify a configuration for communicating requests in the tiered application environment.

11. The computing apparatus of claim 10, wherein the one or more virtual nodes comprises one or more virtual machines.

12. The computing apparatus of claim 10, wherein the load information comprises memory usage or processing system usage by the virtual nodes for the applications.

13. The computing apparatus of claim 10, wherein the load information comprises memory usage or processing system usage on one or more host computing systems that host the virtual nodes.

14. The computing apparatus of claim 10, wherein the program instructions further direct the computing apparatus to, in response to the notification, change a communication rate from the at least one other application from a first rate to a second rate.

15. The computing apparatus of claim 14, wherein the program instructions further direct the computing apparatus to:
    determine that the load information associated with the first application satisfies one or more second load criteria; and communicate a notification to the at least one other application to return to the first rate.

16. The computing apparatus of claim 10, wherein the program instructions further direct the computing apparatus to, in response to the notification, pause communications from the at least one other application.

17. The computing apparatus of claim 10, wherein the at least one other application communicates requests to the first application.

18. The computing apparatus of claim 10, wherein communicating the notification to the at least one other application to modify the configuration for communicating requests in the tiered application environment comprises communicating the notification to the at least one other application to change a destination for requests from the at least one other application.

19. The computing apparatus of claim 10, wherein the program instructions further direct the computing apparatus to update a load balancer in a logical router for the applications.

20. An apparatus comprising:

a storage system;

program instructions stored on the storage system that, when executed by a processing system of a computing system, direct the computing system to:

monitor load information associated with applications in a tiered application environment, wherein each of the applications executes using one or more virtual nodes;

determine that the load information associated with a first application in a first tier of the applications satisfies one or more load criteria;

identify two or more applications of the applications in different tiers above the first application; and communicate a notification to the two or more applications to modify a configuration for communicating requests in the tiered application environment.

* * * * *